United States Patent
Heilig et al.

(10) Patent No.: US 6,739,657 B2
(45) Date of Patent: May 25, 2004

(54) VEHICLE SEAT

(75) Inventors: Alexander Heilig, Wissgoldingen (DE); Thomas Herpich, Uhingen-Sparwiesen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/742,590

(22) Filed: Dec. 21, 2000

(65) Prior Publication Data

US 2001/0005097 A1 Jun. 28, 2001

(30) Foreign Application Priority Data

Dec. 27, 1999 (DE) ..................... 299 22 856 U

(51) Int. Cl.[7] .................. B60N 2/42
(52) U.S. Cl. ................. 297/216.1; 180/282; 280/748; 280/752; 297/284.11
(58) Field of Search .............. 297/216.1, 216.15, 297/216.16, 452.55, 312, 284.1, 284.2, 284.6, 284.11, 217.3, 216.17; 180/271, 274, 282; 280/730.1, 743.1, 753, 748, 741, 752

(56) References Cited

U.S. PATENT DOCUMENTS

| | | | | |
|---|---|---|---|---|
| 4,334,709 A | * | 6/1982 | Akiyama et al. | ....... 297/312 X |
| 4,589,695 A | * | 5/1986 | Isono | .................. 297/284.6 X |
| 4,629,248 A | * | 12/1986 | Mawbey | ............... 297/284.11 |
| 5,137,329 A | * | 8/1992 | Neale | .................. 297/284.1 X |
| 5,607,204 A | * | 3/1997 | Gryp | ..................... 297/284.11 |
| 5,695,242 A | | 12/1997 | Brantman et al. | |
| 5,902,006 A | * | 5/1999 | Janker et al. | ................ 296/153 |

FOREIGN PATENT DOCUMENTS

| | | |
|---|---|---|
| DE | 29610078 | 11/1996 |
| DE | 19548714 | 12/1996 |
| DE | 19541999 | 5/1997 |
| DE | 19702995 | 9/1997 |
| DE | 19844307 | 9/1999 |
| WO | 9400704 | 1/1994 |
| WO | 9743142 | 11/1997 |
| WO | 9841426 | 9/1999 |

OTHER PUBLICATIONS

Mechatronics Forum Newsletter, p. 3, Autumn'98.*

* cited by examiner

Primary Examiner—Peter R. Brown
Assistant Examiner—Stephen Vu
(74) Attorney, Agent, or Firm—Tarolli, Sundheim, Covell & Tummino L.L.P.

(57) ABSTRACT

A vehicle seat includes a seat portion, a seat pan integrated in the seat portion, and a viscous mass arranged within the seat pan, wherein the viscous mass is actuatable to form a ramp.

15 Claims, 1 Drawing Sheet

VEHICLE SEAT

The present invention relates to a vehicle seat comprising a seat portion and a seat pan integrated in the seat portion.

BACKGROUND OF THE INVENTION

In a frontal vehicle impact, the thorax and the head of a vehicle occupant are moved forward until the forward movement of the occupant is limited by a seat belt. In the subsequent recoil, the thorax and the head bump against the back rest and the head rest of the vehicle seat, respectively. For restraining the vehicle occupant wearing a seat belt, the design of the seat pan integrated in the seat portion of the vehicle seat in addition is of particular importance. The design thereof can support the function of the seat belt to the effect that the so-called "submarining effect" is avoided. In a vehicle impact, the vehicle occupant may plunge into the seat portion of the vehicle seat so deep that the seat belt slips to the area of the abdomen of the occupant, where it can cause severe internal injuries. This effect is conventionally avoided in that the seat pan in the seat foam base of the vehicle seat has a rigid ramp-shaped structure, which influences the rotation of the pelvic bone of the vehicle occupant such that the seat belt is prevented from slipping down to the abdominal area.

The rigid structure of the seat pan can, however, also be noticeable in the normal operation of the vehicle and would thus reduce the comfort properties of the vehicle seat.

From the German Utility Model 296 10 078 a vehicle seat is known, which comprises an actuator with a seat pan pivotally mounted in the seat portion. In the case of a frontal vehicle impact, the angle of inclination of the seat surface adjoining the seat pan is increased due to the swivel movement of the seat pan.

The U.S. Pat. No. 5,695,242 describes a vehicle seat comprising a device by means of which a front part of the seat cushion can be raised in the case of a collision. The device may be an air bag, a mechanical spring-loaded part or a pyrotechnically driven device. The device effects a lifting of the legs of the vehicle occupant and thus reduces the risk of injuries in the area of the lower extremities.

The known systems thus require the presence of numerous mechanical parts and components, whose functional reliability can not always be ensured.

SUMMARY OF THE INVENTION

It is an object of the invention to avoid the above-mentioned disadvantages and provide a vehicle seat by means of which the "submarining effect" explained above can be avoided for tall and small occupants in different impact situations.

This object is solved by a vehicle seat comprising a seat portion and a seat pan integrated in the seat portion, which is characterized in that the seat pan is at least partly filled with a viscous mass that can be activated to form a seat ramp.

Suitable viscous masses in particular include those masses which undergo a high change in viscosity by applying an electric or magnetic field. In the following description, these viscous masses will be denoted as electroviscous masses, as well. The change in viscosity advantageously effects a solidification of the viscous mass.

The electroviscous masses suitable in accordance with the invention exhibit an electrorheological or magnetorheological behavior and are known for instance from the field of the steering assistance technologies. Suitable electrologic or magnetorheologic fluids comprise soft polymer particles dispersed in a silicone oil or magnetically soft microspheres of iron, preferably carbony iron, suspended in synthetic hydrocarbon or silicone base fluid.

The electroviscous mass incorporated in the vehicle seat or the seat pan is not noticeable for the vehicle occupant when no voltage is applied. As compared to the seats provided with rigid seat ramps, the vehicle seat thus has clearly improved comfort properties. When the viscous mass incorporated in the seat pan is activated for instance by applying an electric or magnetic field, the stiffening of the viscous mass provides a seat ramp with which the so-called "submarining effect" is avoided.

Due to the very quickly occurring change in state or change in viscosity, the activation of the viscous mass can be effected during the restraining process. The response times of the electroviscous masses preferably lie between 2 and 5 ms. Moreover, the viscous mass can also be activated reversibly by means of an anticipatory sensor system in the vehicle. The time requirements to be satisfied by the activation are distinctly reduced in this embodiment.

The activation of the viscous mass is preferably effected in a predetermined shape, i.e. the viscous mass is incorporated in a cushion which already has the shape of the seat ramp obtained upon activation. In an alternative embodiment, the activation of the viscous mass can also be effected adaptively, i.e. the contour of the mass or the cushion is not changed during the activation of the viscous mass. With this embodiment, particularly high comfort properties can be achieved.

An adaptation of the seat ramp properties to the height of the vehicle occupant can also be achieved by using viscous masses where the change in viscosity is effected in dependence on the loading speed. In smaller persons, the change in viscosity then is less marked than in taller persons, as the latter ones move over the seat at a higher speed. This embodiment is thus based on an activation of the viscous mass by acceleration forces acting on the mass.

DESCRIPTION OF THE DRAWINGS

Further advantages of the invention can be taken from the subsequent description of a particular embodiment in conjunction with the drawing, wherein.

DESCRIPTION OF PREFERRED EMBODIMENTS

Figure 1:
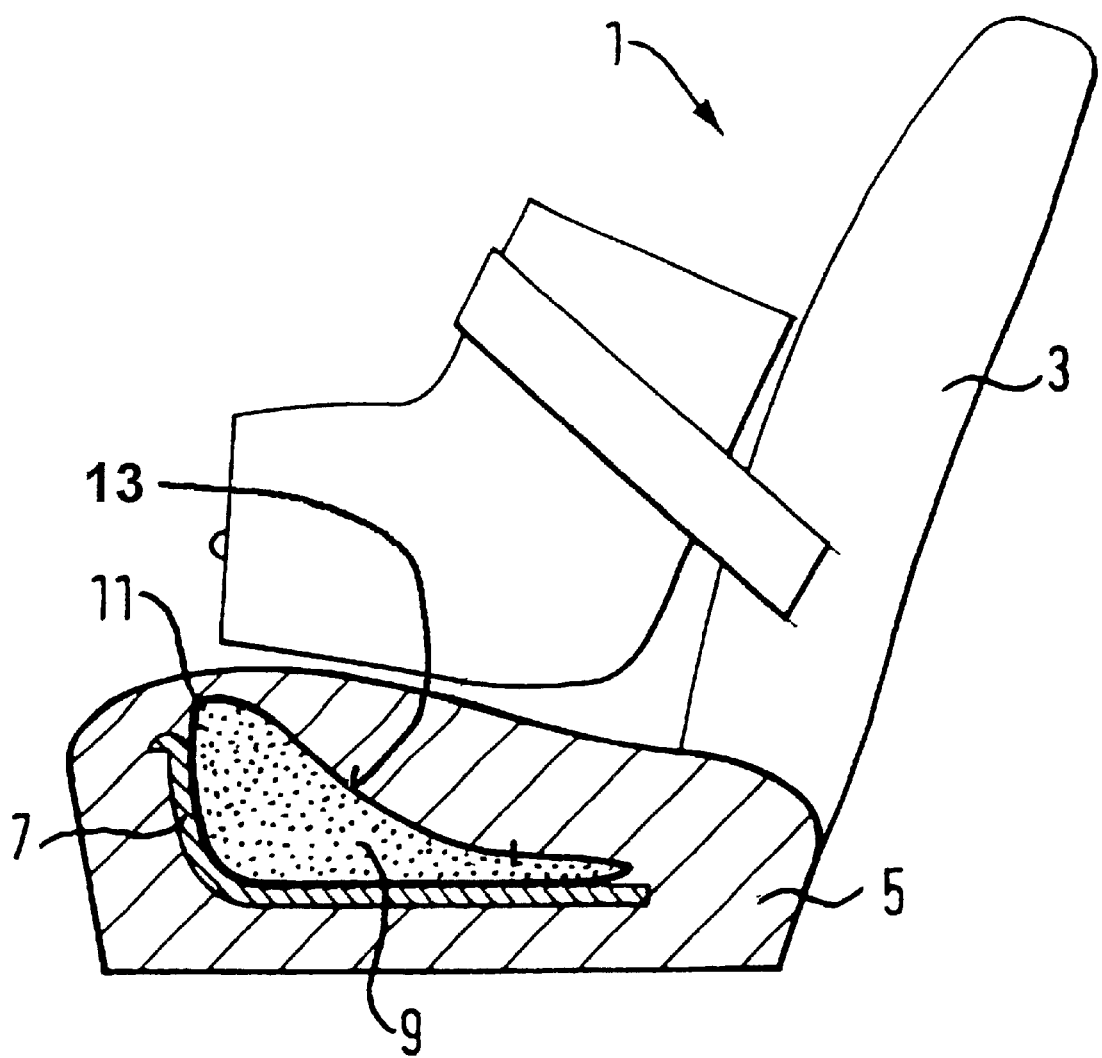
FIG. 1 shows a schematic representation of a vehicle seat in accordance with the invention.

The vehicle seat 1 shown in FIG. 1 comprises a back rest 3 and a seat portion 5. In the seat portion 5, a seat pan 7 is integrated. The seat pan 7 is filled with a viscous mass 9, which can be activated for instance by applying an electric voltage and solidifies as a result of this activation, thereby forming a seat ramp 13.

In the illustrated embodiment, this solidification is effected so as to result in a predetermined shape, i.e. the viscous mass 9 is incorporated in a cushion 11 which substantially already has the shape of the seat ramp 13 formed upon activation. In this case, the viscous mass exhibits a shape-storing behavior and solidifies upon activation in the shape predetermined by the cushion 11.

As an alternative, the solidification can also be effected adaptively, i.e. without a change in contour. In this case, the viscous mass incorporated in the seat cushion 11 will maintain its shape predetermined by the sitting position of the occupant also upon activation.

The activation of the viscous mass is advantageously effected by supplying electric energy, for instance by applying an electric voltage.

The mode of function of the inventive device will be described below:

In the case of a vehicle impact, a sensor system provided in the vehicle supplies an electric pulse, which in turn effects the activation of the viscous mass 9 incorporated in the seat pan 7 of the vehicle seat 1. The viscous mass solidifies as a result of this activation, thereby forming a seat ramp 13. This seat ramp 13 is substantially wedge-shaped, where the area of the seat ramp located in the front portion of the vehicle seat is elevated and inclined in the direction of the rear portion of the seat. The formation of the seat ramp acts against a forward movement of the pelvic bone of the vehicle occupant and thus prevents the applied seat belt from slipping down to the abdominal area of the vehicle occupant.

With the vehicle seat in accordance with the invention a restraint device is provided, which can optimally be adapted to various impact situations and is suited to prevent the occurrence of internal injuries in the abdominal area even with occupants of various heights.

What is claimed is:

1. A vehicle seat for an occupant of a vehicle, said vehicle seat comprising a seat portion on which the occupant sits, a seat pan integrated in the seat portion, and a viscous mass arranged within said seat pan, said viscous mass being at least in part shaped by said seat pan, and a sensor system connected with said viscous mass for generating an electric pulse in response to a vehicle impact, said viscous mass being actuatable to a solid structure by said electric pulse to form a seat ramp which resists movement of the occupant of said seat portion beyond said seat ramp.

2. The vehicle seat as claimed in claim 1, wherein the viscous mass is actuatable to undergo a change in viscosity.

3. The vehicle seat as claimed in claim 2, wherein the change in viscosity is a solidification.

4. The vehicle seat as claimed in claim 3, wherein the solidification is effected in a predetermined shape.

5. The vehicle seat as claimed in claim 3, wherein the solidification is effected without a change in contour of the viscous mass.

6. The vehicle seat as claimed in claim 1, wherein the viscous mass is an electrorheological fluid.

7. The vehicle seat as claimed in claim 6, wherein the viscous mass comprises soft polymer particles dispersed in a silicone oil.

8. The vehicle seat as claimed in claim 1, wherein the viscous mass is actuatable by applying a magnetic field.

9. The vehicle seat as claimed in claim 8, wherein the viscous mass is a magnetorheological fluid.

10. The vehicle seat as claimed in claim 9, wherein the magnetorheological fluid comprises magnetically soft microspheres of iron suspended in one of a synthetic hydrocarbon and silicone based oil.

11. The vehicle seat as claimed in claim 1, wherein the viscous mass is incorporated in a cushion being arranged within the seat pan.

12. A vehicle seat for an occupant of a vehicle, said vehicle seat comprising a seat portion on which the occupant sits, a seat pan integrated in the seat portion, and a viscous mass arranged within said seat pan, said viscous mass being at least in part shaped by said seat pan, and a sensor system connected with said viscous mass for generating an electric pulse in response to a vehicle impact, said viscous mass being actuatable to a solid structure by said electric pulse to form a seat ramp which resists movement of the occupant of said seat portion beyond said seat ramp, said viscous mass being an electrorheological fluid, said viscous mass comprising soft polymer particles dispersed in a silicone oil.

13. A vehicle seat for an occupant of a vehicle, said vehicle seat comprising a seat portion on which the occupant sits, a seat pan integrated in the seat portion, and a viscous mass arranged within said seat pan, said viscous mass being at least in part shaped by said seat pan, and a sensor system connected with said viscous mass for generating a magnetic field in response to a vehicle impact, said viscous mass being actuatable to a solid structure by said magnetic field to form a seat ramp which resists movement of the occupant of said seat portion beyond said seat ramp.

14. The vehicle seat as claimed in claim 13, wherein the viscous mass is a magnetorheological fluid.

15. The vehicle seat as claimed in claim 14, wherein the magnetorheological fluid comprises magnetically soft microspheres of iron suspended in one of a synthetic hydrocarbon and a silicone based oil.

* * * * *